July 30, 1929.  E. T. WILLIAMS  1,722,616
COMPRESSOR
Filed June 18, 1926
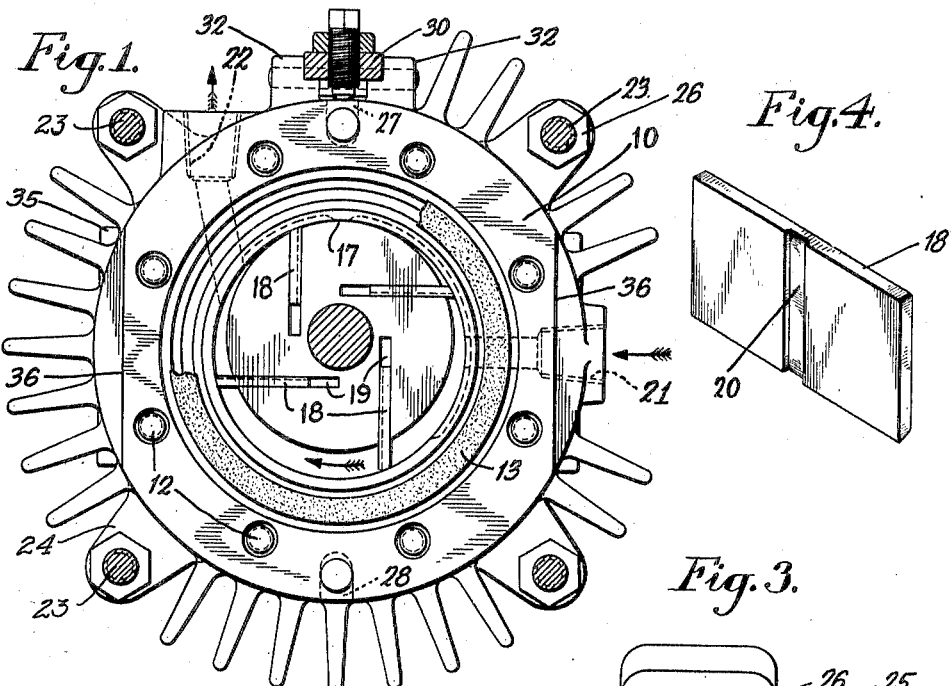
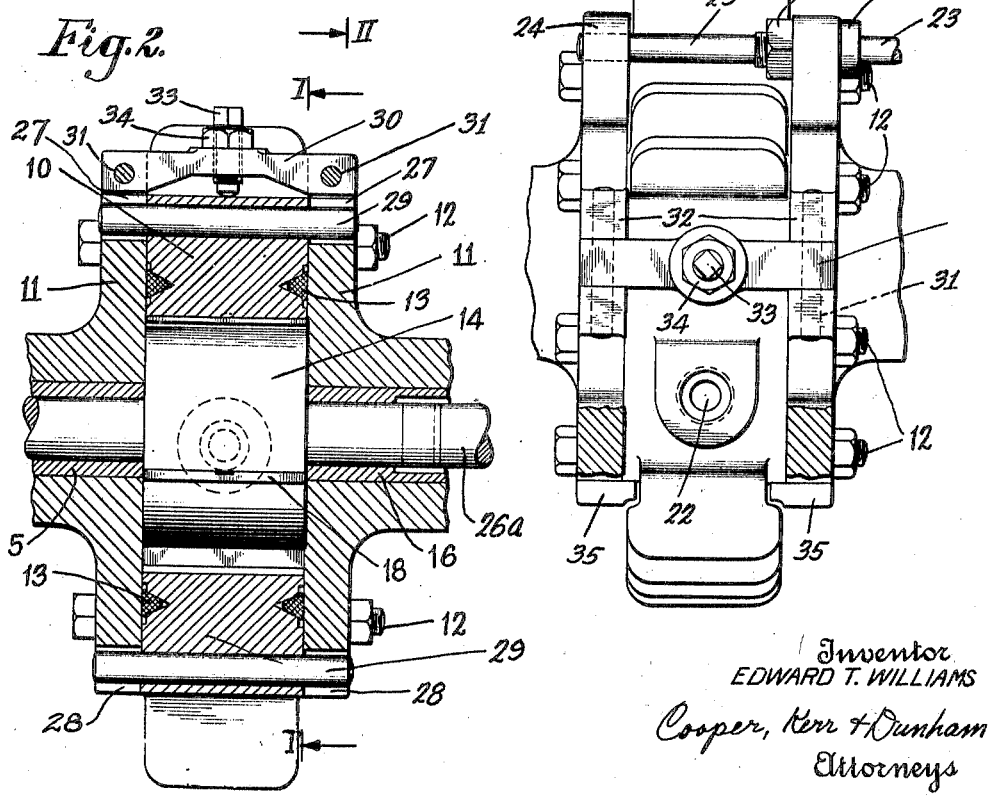
Inventor
EDWARD T. WILLIAMS
Cooper, Kerr & Dunham
Attorneys Patented July 30, 1929.

1,722,616

UNITED STATES PATENT OFFICE.

EDWARD T. WILLIAMS, OF BROOKLYN, NEW YORK.

COMPRESSOR.

Application filed June 18, 1926. Serial No. 116,788.

In rotary compressors of the type in which the rotor revolves on an axis eccentric to the cylinder in which it is mounted it is essential to the efficiency of the machine that close contact be maintained between the rotor and the cylinder, for excessive clearance will permit leakage of gas from the high pressure to the low pressure side. Heretofore the desired closeness of contact between the peripheral surface of the rotor and the cylinder has been attained by accurate machining and fitting of the cylinder and its cover-plates, which are permanently fixed in position by means of dowel pins or the like. However, a very slight wear of the rotor journals or bearings (sometimes less than 0.001 of an inch is sufficient) permits so much clearance to appear between the rotor and the cylinder as to seriously impair the efficiency of the machine or even make it practically useless. Moreover, the gas pressure between the rotor and the cylinder tends to force the two out of contact, thereby putting considerable pressure on the bearings and causing more rapid wear. I have accordingly been led to devise my present invention, which has as a major object to provide a compressor in which provision is made for relative adjustment of the cylinder and rotor whereby the close contact essential to good operating efficiency may be maintained.

Another major object resides in providing a compressor of the type referred to in which the various bearings of the rotor, or of the rotors where more than one stage of compression is used, are maintained in accurate alinement even though axial adjustment of the cover-plates is permissible.

Further objects will be apparent from the following description taken in connection with the accompanying drawing showing a preferred form of compressor embodying the invention, wherein:—

Fig. 1 is a section on line I—I of Fig. 2.

Fig. 2 is a section on line II of Fig. 1.

Fig. 3 is a plan view of the first stage of the compressor shown in Figs. 1 and 2.

Fig. 4 illustrates a rotor vane.

In the compressor illustrated, the hollow cylindrical member 10 is mounted between end portions or cover-plates 11, 11 which are held by bolts, as 12, passing loosely through holes in the cylinder, which holes are substantially larger than the bolts to permit free movement of the cylinder, as explained hereinafter. The covers are effectively sealed to the cylinder by gaskets 13 laid in annular grooves in the cylinder. The cylindrical rotor 14, arranged inside of the cylinder 10, is provided with axial journals mounted in bearings 15, 16, carried by the covers. These bearings are eccentric with respect to the cylinder 10, the various parts being so proportioned that when assembled, as shown, the clearance between the cylindrical surface of the rotor and the inner curved surface of the cylinder, at their point of closest approach, 17, is small enough to permit effectual sealing by a film of oil. Because of the fact that the rotor is cylindrical, this point of closest approach may be defined as an element on the peripheral surface of the rotor which is a line parallel to the axes of the rotor and of the bore of the cylinder. Either one of the bearings may be utilized to mount the compressor on any suitable support, not shown, and the other bearing would serve as a connection between the adjacent cover-plate of a second stage in a multi-stage compressor.

The vanes or blades 18 are mounted to move in and out in the rotor slots 19, but these slots are not radial to the axis of the rotor. The radial arrangement results in rapid wear on the rearward lip of the slot, and I have found that by offsetting the slots from a radial plane this wear is greatly diminished and less frictional resistance to the movements of the vanes is obtained. In the drawings I have arranged four slots symmetrically so that the opposite slots are parallel to each other but such arrangement is only a refinement and is not strictly necessary. It is, however, desirable not to weaken the rotor by placing the slots therein without giving this matter consideration. A rotor in which the slots are disposed tangentially to an imaginary circle, as illustrated, is of a sturdy design and does embody the principle of my invention. Each vane 18 is provided with one or more grooves 20 on its pressure side, for allowing the discharge pressure to act on the rear edge of each vane and to assist the centrifugal force in urging the vane against the wall of the cylinder. This assisting force will vary as the difference of the pressure on both sides of any one vane varies.

At one side of the point 17, (Fig. 1) cylinder 10 is provided with an intake or low pressure opening 21, and at a suitable position on the other side it is provided with an outlet or high pressure opening 22.

If the rotor and cylinder are not close enough together at the point 17 for effectually sealing of the two, leakage of gas from the high to the low pressure side will occur, thereby imparing the efficiency of the machine or even making it wholly inoperative. Upon reflection it will be seen that the pressure at the outlet 22 presses the rotor in a generally downward direction, so that the rotor bearings suffer more rapid wear than would be caused by the weight of the rotor alone, with the result that after a short period of use the wear on the bearings allows enough downward shift of the rotor to destroy the seal and permit an increasing leakage. To overcome this difficulty I provide means for relative adjustment of the cylinder and rotor while maintaining their axes parallel. The latter feature is important since even a very slight divergence from parallelism is enough to cause undue friction as well as leakage. In the particular construction shown, which is only one of many ways for accomplishing the result, the cover-plates are maintained at a predetermined distance apart by means of the bolts 12 which were referred to hereinbefore. These bolts are not intended to keep the axes of the various bearings in alinement and for performing this function, a plurality of rods 23 are provided. These rods are very carefully machined and pass through holes in lugs 24, the holes in the various cover-plates being carefully reamed to close sliding fit with the rods at the same time as the bearings in the process of manufacture. By accurately alining the various cover-plates at that time, it is manifest that their true alinement always will be maintained after assembly and during use of the compressor for the holes and rods 23 are not subject to wear. The alinement of the bearings on either side of a rotor insures parallelism between the axis of the rotor and the axis of its associated cylinder. Each rod 23 has a collar 25 which is held close to the face of one of the lugs by means of a nut 26. Each rod is anchored thusly to only one lug even though the compressor has a plurality of cylinders so that the cover-plates may be varied in relation to each other in an axial direction only; that is, along the axes of rods 23 and of the bearings 15, 16. In a multi-stage compressor, the collar and nut preferably would be placed so as to engage one of the intermediate cover-plates and the ends of rods 23 would extend parallel to the axes of the bearings in various stages thereby maintaining all of the bearings of the various stages in alinement or in parallelism if one rotor required adjustment not required by another rotor. In Fig. 2, 26ª designates the end of a shaft of another rotor (not shown).

Since contacting point 17 is theoretically an element in regard to the cylindrical rotor 14, relative adjustment of the cylinder and rotor must be attained in a plane described by that element and the axis of the rotor. The radial relation of the rotor and cover-plates is fixed by rods 23 and it is only necessary to allow radial adjustment of the relation of the cylinder and adjacent cover-plates. While this adjustment may be obtained in several ways, I propose providing slots 27 and 28 in each cover-plate, the walls of the slots being parallel to the aforementioned plane passing through the point of contact 17 and the axis of the rotor. These slots bear the same relation in each of the cover-plates and in each set of opposite slots 27, 27 (28, 28) there is disposed a pin 29 having a diameter accurately fitting within the space defined by the walls of the slots. These pins fit tightly within holes drilled in the cylinder so that the pins and the cylinders can only be displaced parallel to themselves in respect to the cover-plates.

The natural tendency of the rotor and cylinder is to separate at point 17 under operating conditions and it therefore becomes necessary to maintain the two parts in their efficient contacting relation by some positive and adjustable device. As illustrated, I propose a bridge 30 supported at its ends by normally loose fitting pins 31 passing through lugs 32 extending from the cover-plates. This bridge is tapped at its center so as to accommodate a set-screw 33 adapted to contact the cylinder. The pitch of the set-screw is sufficiently small to allow for a fine adjustment of the set-screw and consequent fine adjustment of the contacting line between the rotor and the cylinder. Upon having obtained the desired setting, lock-nut 34 may be tightened to maintain the setting.

The pins 29 and their guiding slots 27 and 28 are sufficient to guide the movement of the cylinder in a single plane or straight path, but I have illustrated other means by which the same result may be accomplished. These means comprise pairs of parallel surfaces, each pair including the face of a lug 35 on a cover-plate and a flat contacting surface 36 on the cylinder.

My invention is capable of a wide variation and relationship of parts without departure from the nature and principle thereof and I do not restrict myself unessentially in the foregoing or other particulars, but contemplate such alterations and modifications within the scope of the appended claims as may be found to be advisable.

I claim:

1. A compressing apparatus comprising, in combination, a cylinder, a rotor, a cover-plate on each end of said cylinder having bearings for said rotor, means to vary the position of said cylinder in respect to said cover-plates whereby a change in the relation of said rotor in respect to said bearings may be compensated for by adjusting said cylinder in respect to said bearings, and means to cause said adjustment to be obtained in a single linear plane.

2. A compressing apparatus comprising, in combination, a cylinder, a rotor within said cylinder, cover-plates having bearings for said rotor, means for maintaining said cover-plates at a fixed distance apart without affecting restraint of radial movement, and means for maintaining said cover-plates in axial alinement without affecting restraint of axial movement.

3. A compressing apparatus comprising, in combination, a cylinder, a rotor within said cylinder, cover-plates having bearings for said rotor, means for maintaining said cover-plates in a fixed axial relation to said cylinder without affecting restraint of radial adjustment of said cylinder, and means for maintaining alinement of said bearings and permitting axial adjustment of said cover-plates.

4. A compressing apparatus comprising a stationary housing, a rotor within said housing, said housing comprising end portions adjacent the ends of the rotor and a hollow member between the end portions surrounding the rotor, bearings in said end portions determining the axis of rotation of the rotor, axially extending aligning means fixed to one of the end portions and having close sliding fit with the other end portion for maintaining the end portions in fixed alignment for different relative axial positions, a bridge mounted across the end portions carrying a screw adjustment for adjusting the position of the hollow member by bodily moving the hollow member relative to the end portions and means for drawing the end portions together against the hollow member, the end portions being guided relative to each other and held in alignment by the aligning means.

5. A compressing apparatus comprising a stationary housing, a rotor within said housing, said housing comprising end portions adjacent the ends of the rotor and a hollow member between the end portions surrounding the rotor, bearings in said end portions determining the axis of rotation of the rotor, axially extending aligning means fixed to one of the end portions and having close sliding fit with the other end portion for maintaining the end portions in fixed alignment for different relative axial positions, means for adjusting the position of the hollow member by bodily moving the hollow member relative to the end portions and means for drawing the end portions together against the hollow member, the end portions being guided relative to each other and held in alignment by the aligning means.

6. A compressing apparatus comprising a stationary housing, a rotor within said housing, said housing comprising end portions adjacent the ends of the rotor and a hollow member between the end portions surrounding the rotor, bearings in said end portions determining the axis of rotation of the rotor, axially extending aligning means fixed to one of the end portions and having close sliding fit with the other end portion for maintaining the end portions in fixed alignment for different relative axial positions, means for adjusting the position of the hollow member by bodily moving the hollow member relative to the end portions transversely of the axis of rotation and means for drawing the end portions together against the hollow member, the end portions being guided relative to each other and held in alignment by the aligning means.

7. A compressing apparatus comprising a stationary housing, a rotor within said housing, said housing comprising end portions adjacent the ends of the rotor and a hollow member between the end portions surrounding the rotor, bearings in said end portions determining the axis of rotation of the rotor, axially extending aligning means fixed to one of the end portions and having close sliding fit with the other end portion for maintaining the end portions in fixed alignment for different relative axial positions, means for adjusting the position of the hollow member from outside the housing without altering the inner surface of the hollow member and means for drawing the end portions together against the hollow member, the end portions being guided and held in alignment by the aligning means.

8. A compressing apparatus comprising a stationary housing, a rotor within said housing, said housing comprising cover-plates adjacent the ends of the rotor and a hollow member between the cover-plates surrounding the rotor, bearings in said cover-plates determining the axis of rotation of the rotor, axially extending aligning means fixed to one of the cover-plates and having close sliding fit with the other cover-plate for maintaining the cover-plates in fixed alignment for different relative axial positions, means for adjusting the position of the hollow member by bodily moving the hollow member relative to the cover-plates and means for drawing the cover-plates together against the hollow member, the cover-plates being guided relative to each other and held in alignment by the aligning means.

9. A compressing apparatus comprising a stationary housing, a rotor within said housing, said housing comprising end portions adjacent the ends of the rotor and a hollow member between the end portions surrounding the rotor, bearings in said end portions determining the axis of rotation of the rotor, axially extending aligning means comprising parts attached to the end portions having close sliding fit with each other for maintaining the end portions in fixed alignment for different relative axial positions, means for adjusting the position of the hollow member relative to the end portions and means for drawing the end portions together against the hollow member, the end portions being guided relative to each other and held in alignment by the aligning means.

10. A compressing apparatus comprising a stationary housing, a rotor within said housing, said housing comprising cover-plates adjacent the ends of the rotor and a hollow member between the cover-plates surrounding the rotor, bearings in said cover-plates determining the axis of rotation of the rotor, axially extending rods fixed to one of the cover-plates and having close sliding fit with the other cover-plate for maintaining the cover-plates in fixed alignment for different relative axial positions, means for adjusting the position of the hollow member by bodily moving the hollow member relative to the cover-plates and bolts independent of the aforementioned rods for drawing the cover-plates together against the hollow member, the cover-plates being guided relative to each other and held in alignment by the aligning means.

11. A compressing apparatus comprising a stationary housing, a rotor within said housing, said housing comprising end portions adjacent the ends of the rotor and a hollow member between the end portions surrounding the rotor, bearings in said end portions determining the axis of rotation of the rotor, axially extending aligning means fixed to one of the end portions and having close sliding fit with the other end portion for maintaining the end portions in fixed alignment for different relative axial positions, means for adjusting the position of the hollow member by bodily moving the hollow member relative to the end portions, means for drawing the end portions together against the hollow member, the end portions being guided relative to each other and held in alignment by the aligning means and means for directing the bodily movement of the hollow member along one radius.

12. A compressing apparatus comprising a stationary housing, a rotor within said housing, said housing comprising end portions adjacent the ends of the rotor and a hollow member between the end portions surrounding the rotor, bearings in said end portions determining the axis of rotation of the rotor, axially extending aligning means fixed to one of the end portions and having close sliding fit with the other end portion for maintaining the end portions in fixed alignment for different relative axial positions, means for adjusting the position of the hollow member by bodily moving the hollow member relative to the end portions, means for drawing the end portions together against the hollow member, the end portions being guided relative to each other and held in alignment by the aligning means and cooperating pins and slots in the hollow member and the cover-plates for directing the bodily movement of the hollow member along one radius.

13. A compressor comprising a cylinder, a rotor, a cover-plate on each end of said cylinder, bearings in said cover-plates, means for maintaining said cover-plates in fixed radial relation and said bearings in alignment for different relative axial positions of said cover-plates and means to adjust said cylinder in a straight path.

14. A compressor comprising a cylinder, a rotor, a cover-plate on each end of said cylinder, bearings in said cover-plates means for maintaining said cover-plates in fixed radial relation and said bearings in alignment for different relative axial positions of said cover-plates and adjusting means to move said cylinder between said cover-plates in a straight radial path.

15. A compressing apparatus comprising a stationary housing, a rotor within said housing, said housing comprising end portions adjacent the ends of the rotor and a hollow member between the end portions surrounding the rotor, bearings in said end portions determining the axis of rotation of the rotor, aligning means comprising co-operating relatively slidable parts having close sliding fit for maintaining the end portions in fixed alignment for different relative axial positions, means for adjusting the position of the hollow member from outside the housing without altering the inner surface of the hollow member and means for drawing the end portions together against the hollow member, the end portions being guided and held in alignment by the aligning means.

16. A compressing apparatus comprising a stationary housing, a rotor within said housing, said housing comprising end portions adjacent the ends of the rotor and a hollow member between the end portions surrounding the rotor, bearings in said end portions determining the axis of rotation of the rotor, aligning means comprising co-operating relatively slidable parts having close sliding fit for maintaining the end portions in fixed alignment for different relative axial positions, adjusting means for varying the relation of the rotor to the hollow member and means for drawing the end portions together against the hollow member, the end portions being guided and held in alignment by the aligning means.

17. Apparatus as set out in claim 16 wherein the means for drawing the end portions together is independent of the aligning means.

18. A compressing apparatus comprising a stationary housing, a rotor within said housing, said housing comprising end portions adjacent the ends of the rotor and a hollow member surrounding the rotor adapted to be clamped between the end portions, bearings in said end portions determining the axis of rotation of the rotor, aligning means comprising co-operating relatively slidable parts having close sliding fit for maintaining the end portions in fixed alignment for different relative axial positions and adjusting means for varying the relation of the rotor to the hollow member.

In testimony whereof I hereto affix my signature.

EDWARD T. WILLIAMS.